United States Patent [19]
Newton et al.

[11] Patent Number: 5,115,612
[45] Date of Patent: May 26, 1992

[54] TRANSPARENT THERMAL PANEL

[75] Inventors: Anthony J. Newton; David Budney, both of Edmonton, Canada

[73] Assignee: Vacuglas, Inc., Edmonton, Canada

[21] Appl. No.: 493,388

[22] Filed: Mar. 14, 1990

[51] Int. Cl.$^5$ .............................................. E06B 3/00
[52] U.S. Cl. ....................................... 52/208; 52/222; 52/235
[58] Field of Search ................ 52/208, 788, 790, 235, 52/222, 171

[56] References Cited

U.S. PATENT DOCUMENTS

| | | | |
|---|---|---|---|
| 2,683,678 | 7/1954 | Adams | 52/208 |
| 3,382,630 | 5/1968 | Chivers | 52/208 |
| 3,444,662 | 5/1969 | Partain | 52/208 X |
| 3,866,374 | 2/1975 | Dallen | 52/208 X |
| 4,184,480 | 1/1980 | Kenny | 52/788 X |
| 4,324,373 | 4/1982 | Zibritosky | 52/208 X |
| 4,665,662 | 5/1987 | Swanborn | 52/235 |
| 4,680,206 | 7/1987 | Yoxon et al. | 52/788 X |
| 4,683,154 | 7/1987 | Benson et al. | 52/788 X |
| 4,738,065 | 4/1988 | Crandell | 52/235 |
| 4,899,507 | 2/1990 | Mairlot | 52/222 |

Primary Examiner—Philip C. Kannan
Attorney, Agent, or Firm—Anthony R. Lambert

[57] ABSTRACT

A transparent thermal panel is formed by two panes of glass each curved concentrically about one axis to form a section of a cylinder, and each being sealed at their edges. The envelope thus produced is evacuated. The evacuated glass envelope is attached to the uprights of a frame using a torsioned clamp which counteracts the bending stresses created by the vacuum in the glass envelope.

Two such evacuated glass envelopes may be joined together and a solar collector placed between them. Combinations of one or both of the thermal panel and the solar collector may be used to cover the outside of a building.

Coating the interior of the panels with a low emissivity material provides for increased R value.

4 Claims, 7 Drawing Sheets

TRANSPARENT THERMAL PANEL

FIELD OF INVENTION

This invention relates to insulated windows and solar collectors.

BACKGROUND OF THE INVENTION

It is known to use an evacuated space between glass panels to provide an insulated window that is superior over standard double glazing without evacuation of the space between the glass panels. Examples of such evacuated glass panels or envelopes are shown in Johnson, U.S. Pat. No. 4,185,616 dated 29 Jan., 1980, Kenny, U.S. Pat. No. 4,184,480 dated 22 Jan., 1980 and Benson, U.S. Pat. No. 4,683,154 dated 28 Jul., 1987.

In any such design, it is necessary to separate the glass sheets or panes forming the evacuated glass panels. If flat panes are used, there is a tendency for the panes to bend under atmospheric pressure and break or touch, destroying the insulating utility of the envelope. To solve this problem, Benson discloses the use of glass beads located between the panes. Kenny's solution is to provide a sinusoidally corrugated glass envelope, which, in order to obtain maximum uniform tensile strength, has upwardly extending corrugations each contoured laterally of the window to form a paraboloid. Johnson also discloses the use of a curved panel, and, to eliminate bending stresses in the panel, created by the evacuation of the interior of the panel, the perimeter of the panel is tensioned. Thus, in Johnson, the transparent panel is held in tension by using a complexly configured glass panel, and a complexly shaped basin to receive the glass panel, and to exert pressure on the interior complexly shaped panel.

Such solutions to the problem of providing an evacuated glass envelope as are shown in Johnson and Kenny require complexly shaped glass panels, or, as shown in Benson, }requires glass beads or spacers. Such configurations result in the thermal panels being difficult to construct.

SUMMARY OF THE INVENTION

The inventors have provided a novel solution to providing an evacuated window envelope for use as a thermal panel or with a solar collector and in one aspect comprises:

a rectangular frame having first and second posts forming opposite parallel sides of the rectangular frame;

an evacuated glass envelope having first and second parallel edges and having a first axis parallel to the first and second parallel edges, the glass envelope being formed by inner and outer panes curved in the same direction about the first axis and being sealed about their respective peripheries;

first and second torsion means connected to the first and second post respectively and to the first and second parallel edges of the glass envelope respectfully for placing torsional forces on the glass envelope to balance the compressional and tensional forces in the outer and inner panes respectively.

BRIEF DESCRIPTION OF THE FIGURES

There will now be described preferred embodiments of the invention, With reference to the figures by way of example and in which like numerals denote like elements, in which.

DETAILED DESCRIPTION OF THE PREFERRED EMBODIMENTS

Figure 2A:
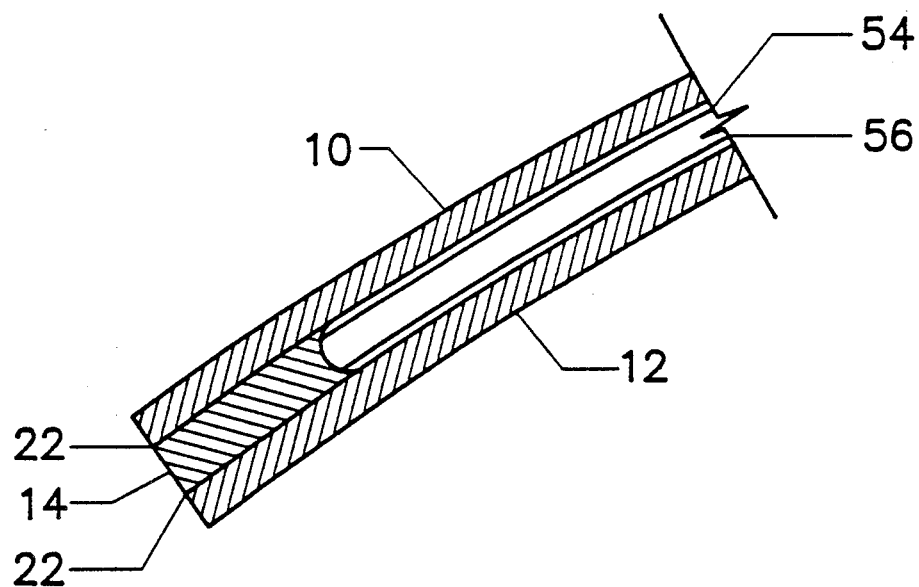
FIG. 2A is a cross-section (full size) through a side seal for an evacuated glass envelope according to the invention.
Figure 2B:
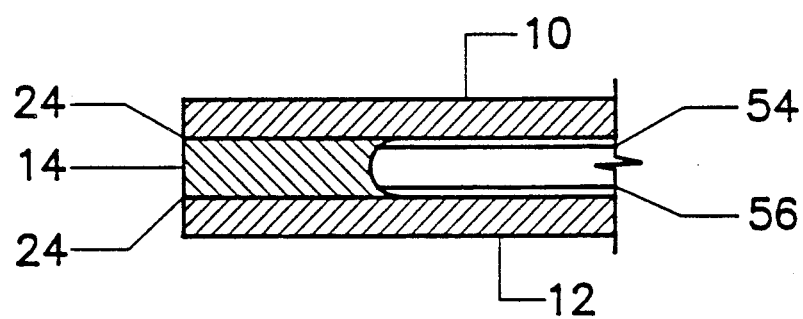
FIG. 2B is a cross-section (full size) through an end seal for an evacuated glass envelope according to the invention.
Figures 3B, 3C:
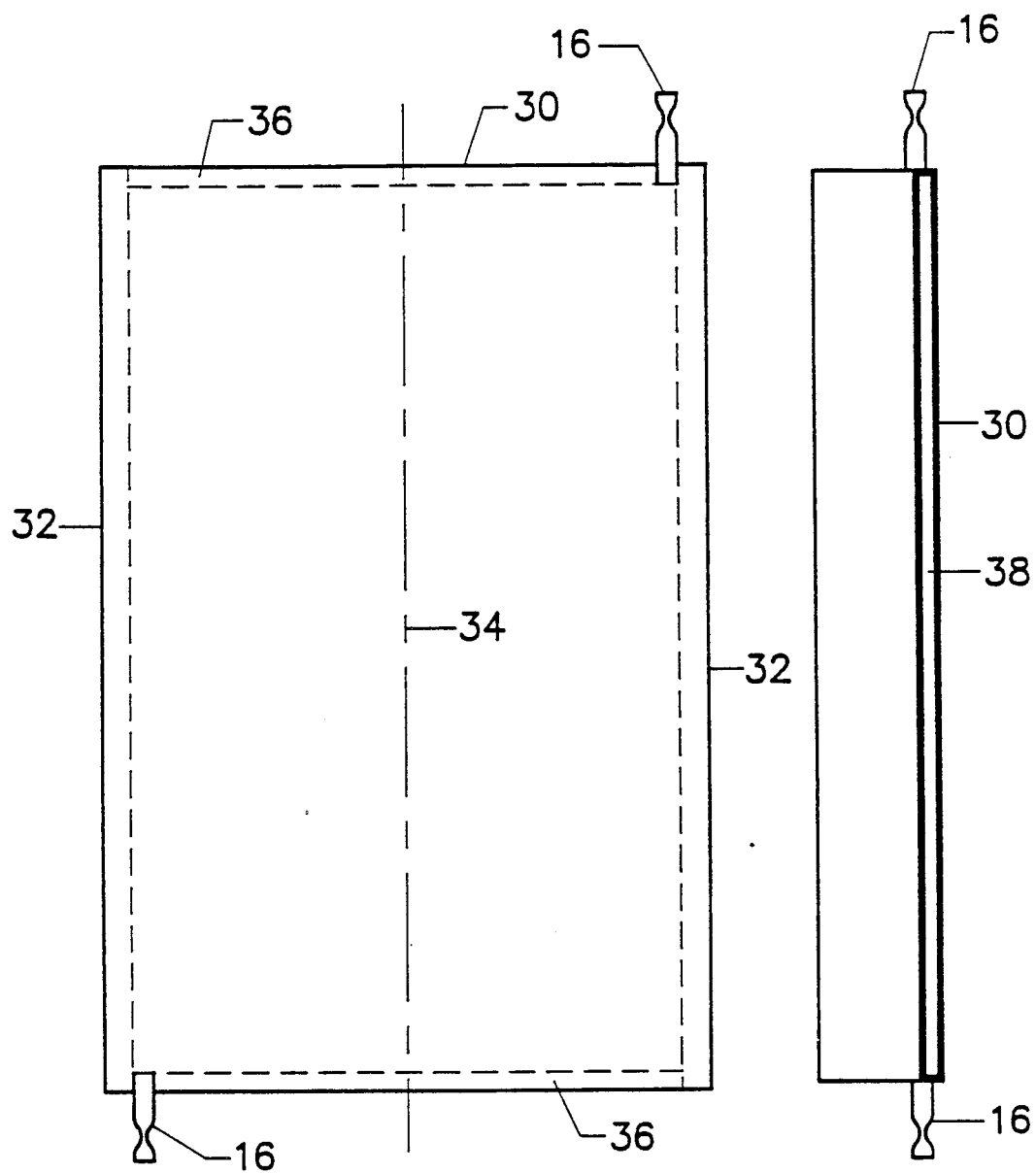
FIG. 3B is a plan view schematic of an evacuated glass envelope according to the invention.
FIG. 3C is an end view schematic of an evacuated glass envelope according to the invention.
Figure 3A:
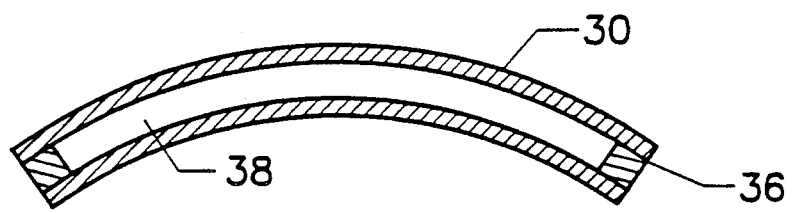
FIG. 3A is a schematic cross-section of an evacuated glass envelope according to the invention.
Figure 4:
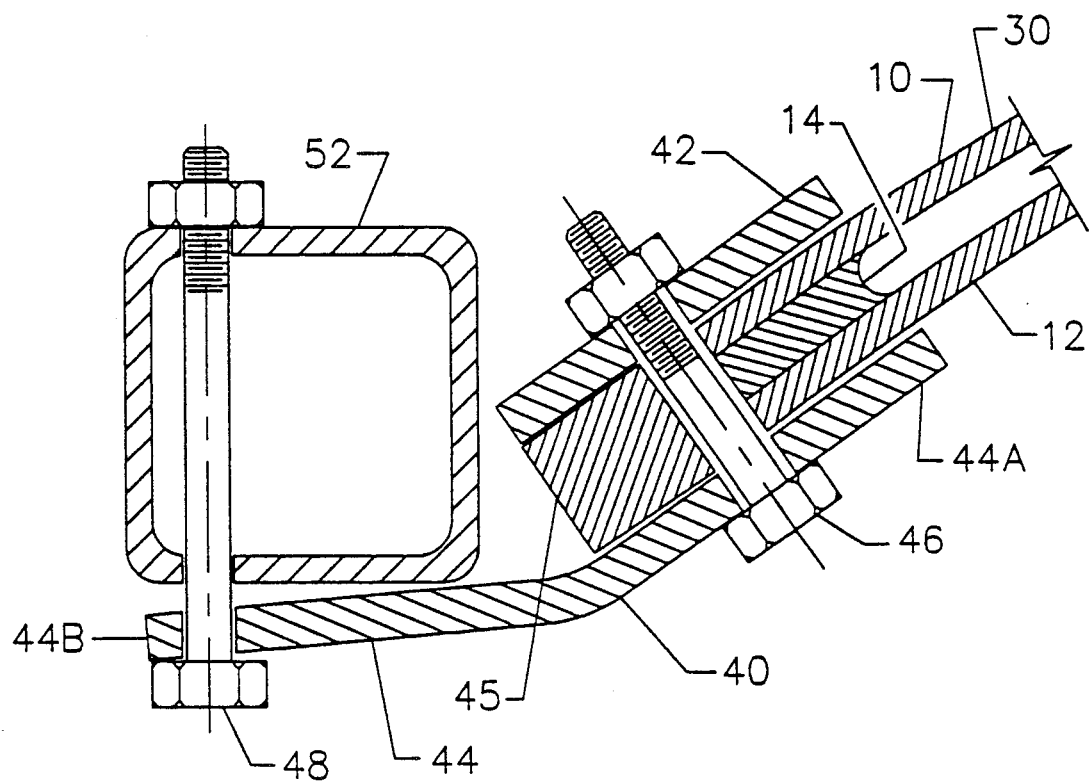
FIG. 4 is a cross-section detail of a torsional clamp for an evacuated glass envelope according to the invention.
Figure 5:
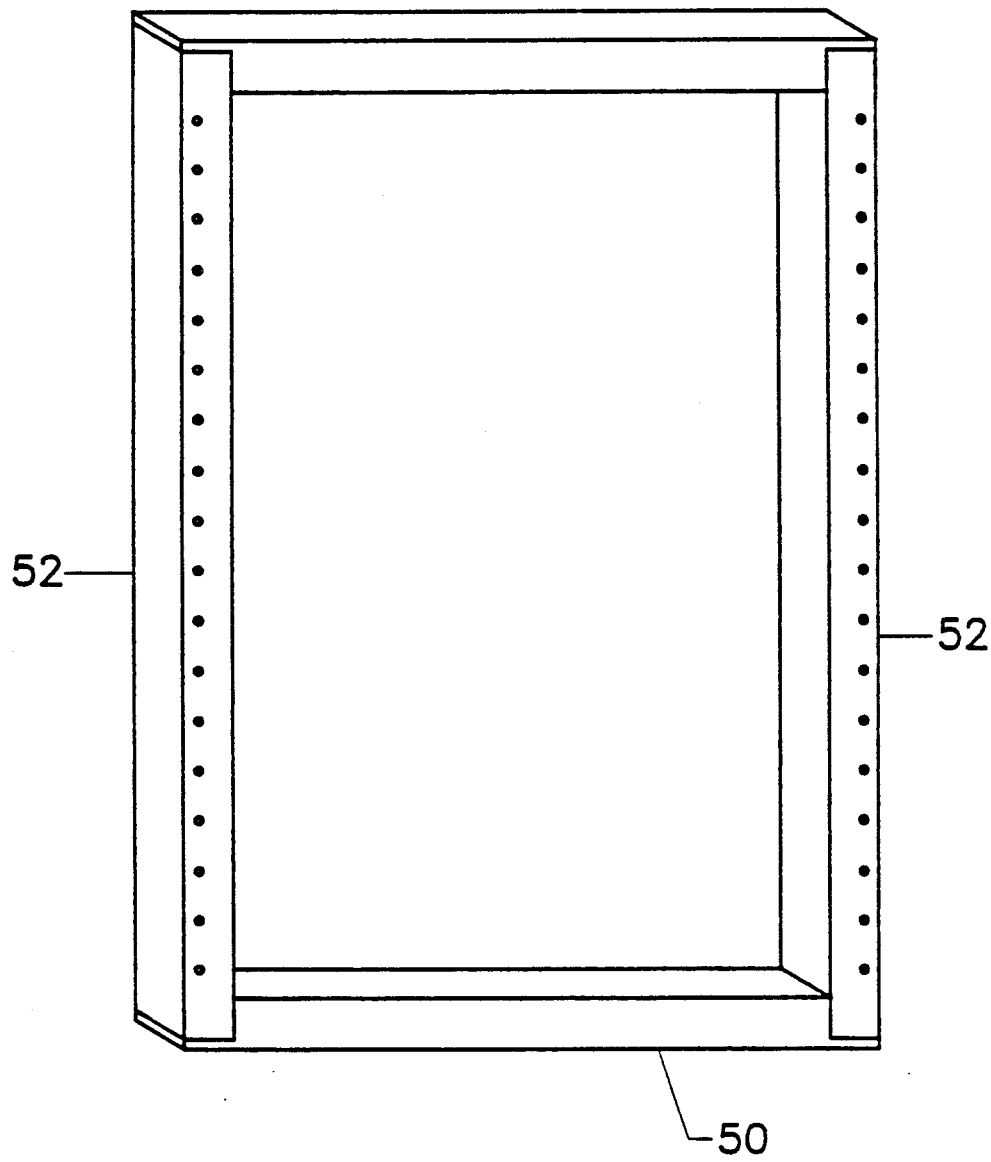
FIG. 5 is a perspective view of a frame for holding an evacuated glass envelope according to the invention.

The transparent thermal panel or window module of the invention is made from a rectangular frame, best seen in FIG. 5, an evacuated glass envelope, best seen in FIGS. 2 and 3, end torsion means for connecting the upright posts of the rectangular frame to the evacuated glass envelope, as best seen in FIG. 4. Generally, the construction of the evacuated glass envelope forms a cylindrical section. Thus, on the evacuation of the glass envelope, the bending stresses are experienced only along the edges of the glass envelope that are parallel to the axis about which the glass envelope is curved to form the cylindrical section. Thus, the ends of the glass envelope do not experience the bending stresses.

The torsion means counteracts the bending stresses caused by the evacuation of the air within the glass envelope, as discussed in more detail below with reference to FIG. 4. Because of the construction of the window module, the unstressed ends of the glass envelope do not need the stress reduction mechanism shown in FIG. 4.

Not shown in the drawings, but required for practical construction of a building, as would be clear to a person skilled in the art, is insulation between the frame and the evacuated glass envelope.

Figure 1A:
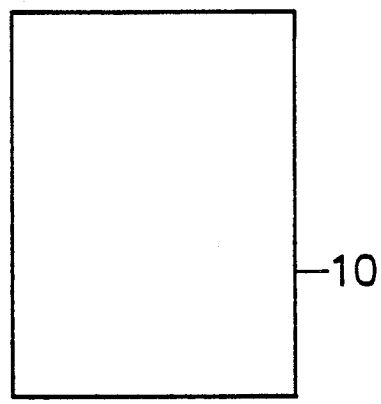
FIG. 1A is a plan view schematic of an upper pane for an evacuated glass envelope according to the invention.
Figure 1B:
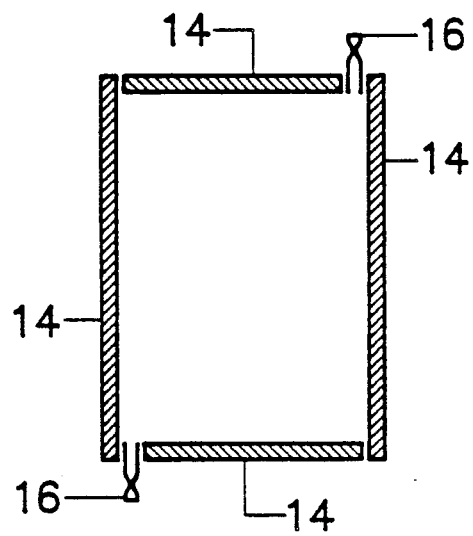
FIG. 1B is a plan view schematic of a set of spacers for an evacuated glass envelope according to the invention.
Figure 1C:
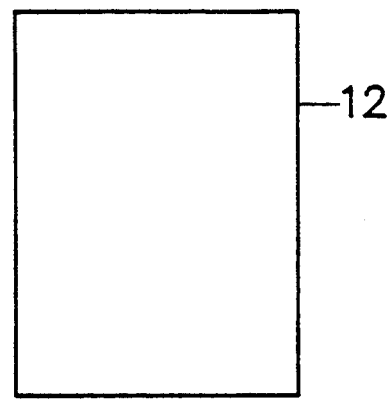
FIG. 1C is a plan view schematic of a lower pane for an evacuated glass envelope according to the invention.

Referring to FIG. 1, there is shown a first glass pane or sheet 10 which forms the top panel of an evacuated glass envelope 30 shown in FIG. 3. The bottom sheet or pane 12 is similar in construction to the top sheet or pane. The panes 10 and 12 are preferably made of aluminosilicate glass chemically tempered to have a strength of at least 1,500 psi, required to resist atmospheric pressure on the evacuated glass envelope, and preferably 10,000 psi. For example, the glass used by Corning Glassworks of Corning, New York, in its VISIONS TM (a Trademark of Corning Glassworks) cooking ware provides satisfactory strength. Spacers or seals 14 and glass nipples 16 are also preferably made of the same kind of glass. The dimensions of the spacers 14 and glass nipples 16 should be such as to provide a continuous circumference having the same dimensions as the top and bottom panels 10 and 12. The glass nipples 16 allow for evacuation of air from the evacuated glass envelope and also the circulation of tempering salts used in the hardening process.

For assembly, the panes 10 and 12 shown in FIG. 1 are laid out on stainless steel moulds having the desired shapes own in FIG. 3. So that the panes 10 and 12 are concentric, their radii of curvature and thus the required moulds, should be slightly different. Each of the panes 10 and 12 is then inserted into an oven and heated to above the sag temperature of the glass, and allowed to sag to the desired shape.

Referring to FIG. 2, glass panes 10 and 12 and spacers 14 are then assembled and fused together by laser light or electric resistance welding (both processes being well known in the art) to form a side seal 22 and an end seal 24. In the example shown, the panes 10 and 12 are about 18 inches by 24 inches, the spacers are 1 inch wide, and the radius of curvature of the centre of the evacuated glass envelope is 20 inches. The glass components may then be allowed to cool and anneal.

Alternatively, the panes 10 and 12 together with spacers 14 may be assembled first and the envelopes sealed with the panes 10 and 12 unsagged. Once the edges of the glass envelope 30 are sealed, the assembly may be placed in an oven and the temperature of the oven increased to allow the glass envelope 30 to sag to the desired shape shown in FIG. 3. When the assembly has sagged to the desired shape, the temperature of the oven is gradually reduced to anneal the glass components.

As shown in FIG. 3, either procedure results in a glass envelope 30 having a cylindrical shape. In effect, the glass envelope 30 has an axis 34 with edges 32 parallel to the axis 34, and the glass envelope 30 is folded or curved about the axis 34, the edges 32 remaining parallel to the axis 34. The cooled assembly may then be immersed in a heated salt bath to chemically harden. Glass is particularly prone to break under tension, and therefore it is particularly desirable to chemically harden the glass that is placed under tension.

The result of these processes is a glass envelope 30 with a sealed periphery 36 and an interior 38 which may be evacuated using the nipples 16.

The glass envelope 30 is attached to a frame 50, such as is shown in FIG. 5, using a torsion means 40 such as is shown in FIG. 4. The long edges 32 of the glass envelope 30 are attached to posts 52 of frame 50 using the torsion means 40. The torsion means 40 is formed from a flat steel plate 42, a curved plate 44 and bolts 46 and 48. The steel plate 42 and one end 44A of the curved plate 44 receive the edge 32 of the glass envelope 30. An adhesive may be used to secure the glass envelope 30 in place. A spacer 45 may be used to prevent excessive forces from shattering the glass in the edge of the glass envelope 30. The spacer 45 may be made of brass or glass or other material with the same coefficient of expansion and contraction as the glass. As shown in FIG. 4, the orientation of the edge 32 of the glass envelope 30 should be close to parallel with the plate 42 and the end 44A of the curved plate 44. If this parallel configuration is not obtained, then additional strength in the glass may be required to prevent fracturing or shattering of the glass.

In an alternative method of evacuating the glass envelope 30, the nipples 16 may be omitted. In this embodiment, the panes 10 and 12 and spacers 14 are joined together to form the evacuated glass envelope 30 in an environment where the air has already been evacuated.

End 44B of curved plate 44 is attached by bolt 48 to the post 52. By placing the end 44B at an angle, and using part of the post 52 as a fulcrum, an adjustable torsional strength may be placed on the edge 32 of the glass envelope 30. This torsional stress counteracts the compressional and tensional forces that occur in the outer pane 12 and inner pane 10 respectively. The torsional stresses required to be produced by the torsion means 40 may be calculated from known methods in the art.

To assemble the glass envelope 30 in the frame 50 using the torsion means 40, air is removed from the glass envelope 30 using the nipples 16 while the bolts 48 on either side of the glass envelope 30 are gradually tightened. Thus for every small decrease in the pressure in the glass envelope 30, all of the bolts on both sides of the frame should be tightened a small amount, as determined by the required additional stresses to counteract the compressional forces in the outer pane 12 and the tensional forces in the inner pane 10. The two glass nipples 16 are preferably sealed when a desired vacuum is drawn, such as $10^{-4}$ torr.

In the embodiment in which the evacuated glass envelope 30 is manufactured in an already evacuated place, the torsion on the edges of the glass envelope should be applied gradually while air is being allowed into the evacuated area. This has the same effect of gradually building up the hoop stresses in the glass while the counteracting stresses are placed in the glass by the torsion means 40.

By coating one or both of the insides 54 and 56 of the glass envelope 30 with a low emissivity material 58, considerably enhanced insulating capacity may be obtained. For example, with the construction described above, the effective R-value of the assembly without the low emissivity coating is in the order of 1.5, while with a low emissivity coating, the R-value of the assembly exceeds 20, with a low emissivity coating having an emissivity of 0.05. Low emissivity coatings are well known in the art. Typically, a low emissivity coating may either be applied by sputtering a UV coating onto the glass, or by applying a plasticized UV coating to the glass. Where shatter resistant glass is desired, it is preferable to use the plasticized coating.

Figures 6A, 6B:
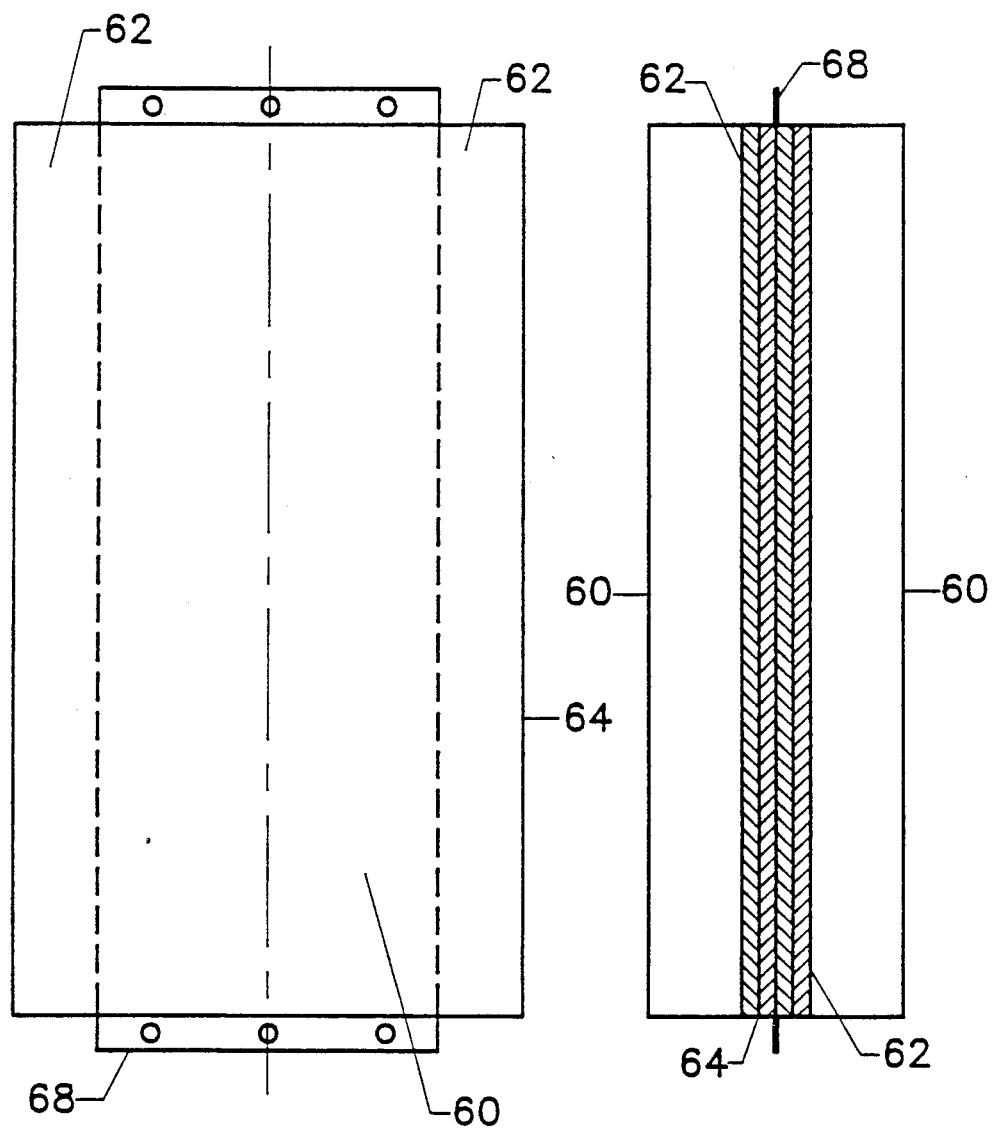
FIG. 6A is a top view showing an alternative embodiment of an evacuated glass envelope according to the invention showing a solar collector with two facing evacuated glass envelopes.
FIG. 6B is a side view of the alternative embodiment shown in FIG. 6A.
Figure 6C:
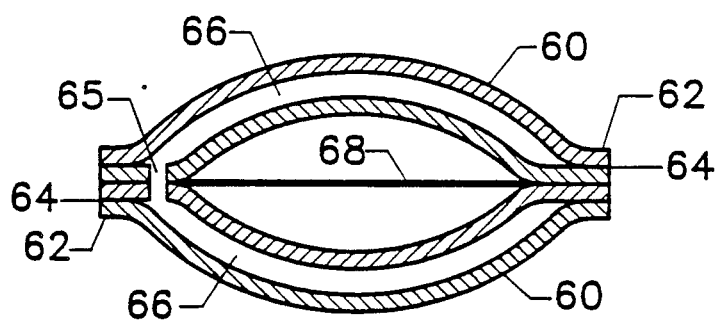
FIG. 6C is an end section of the alternative embodiment shown in FIG. 6A.

Referring to FIGS. 6A, 6B and 6C, a pair of evacuated glass envelopes 60, constructed as described above but having flattened sections 62, and omitting spacers 14 along the edges 64, may be used as a solar collector. The interiors 66 of the envelopes 30 are evacuated as before, and a selective solar absorber panel 68 is placed in between the glass envelopes 60. The glass envelopes preferably have connected interiors, for example through opening 65, so that they share a common vacuum. The vacuum created in the two glass envelopes 60 creates hoop stresses in the glass panes forming the envelopes, and these stresses cancel out when the two glass envelopes are joined together. Using low emissivity coatings on the insides of the glass envelope 60 similarly increases the R-value of the envelope 60 to produce an efficient solar energy collector. The absorber panel 68 may be simply a metal plate. When the solar collector is installed in the building, air between the two evacuated glass envelopes 60 is heated in the vicinity of the absorber panel 68 and rises to the top of the solar collector module. This heated air may be circulated through ducts (not shown) and further use made of the energy in the heated air.

Figure 7:
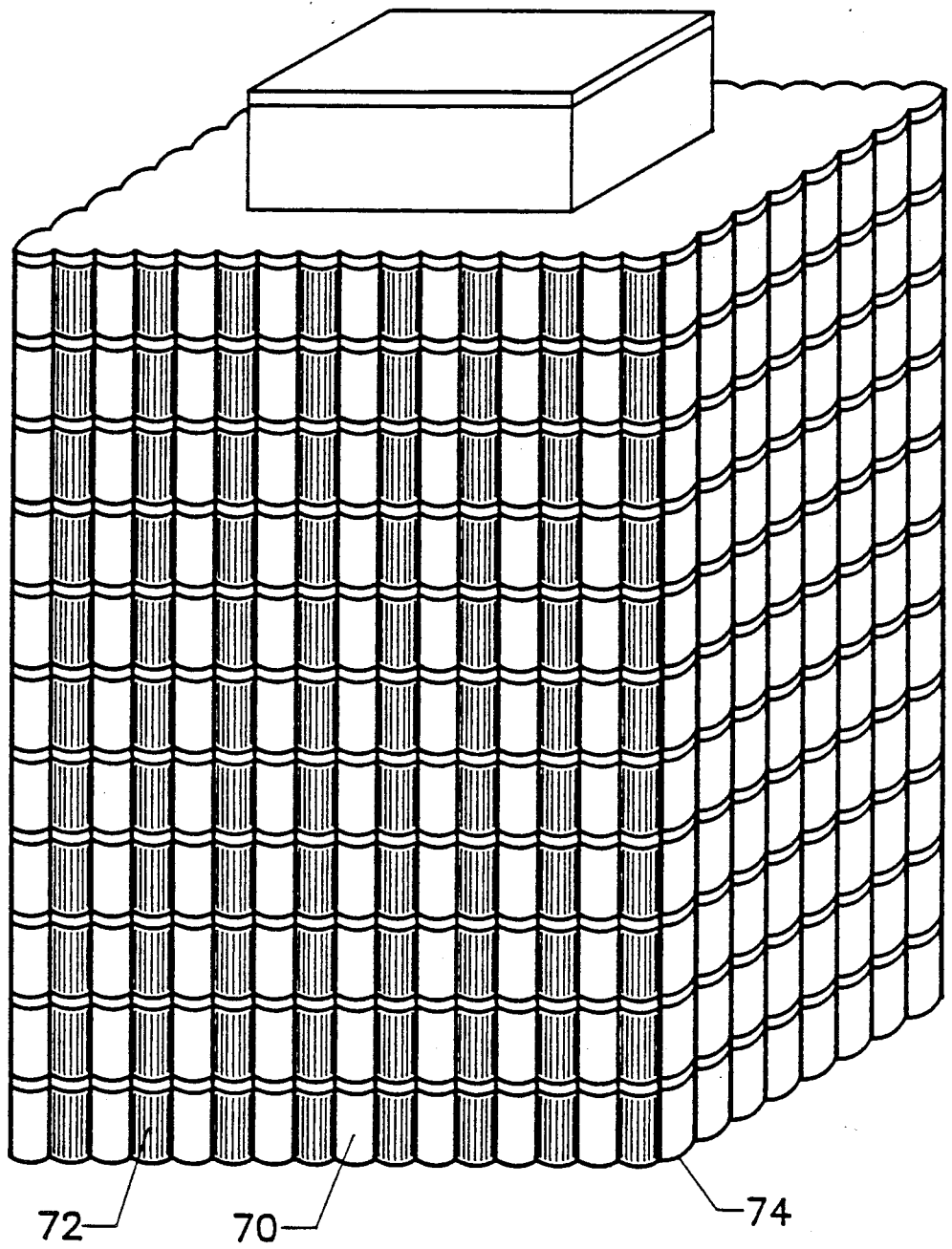
FIG. 7 is a schematic of a building having windows and solar collectors according to the invention.

Referring to FIG. 7, a building 74 may be constructed from a plurality of window modules 70 and solar collectors 72. For example, the solar collector 72 may be placed only on a south facing side, with the other sides of the building having only window module 70. Various configurations of the windows and solar collectors may be used.

For the construction of a building as is shown in FIG. 7, it is necessary to insulate the edges of the frames 50, and this can be done using any of various known methods, for example using blown foam around the edges of the glass envelope, or spun carbon. However, other methods of insulation may be used.

We claim:

1. A window module comprising:
    a rectangular frame having first and second posts forming opposite parallel sides of the rectangular frame;
    an evacuated glass envelope having first and second parallel edges and having a first axis parallel to the first and second parallel edges, the glass envelope being formed by inner and outer panes curved in the same direction about the first axis and being sealed about their respective peripheries;
    first and second torsion means connected to the first and second posts respectively and to the first and second parallel edges of the glass envelope respectively for placing torsional forces on the glass envelope to balance the compressional and tensional forces in the outer and inner panes respectively.

2. The window module of claim 1 in which each of the inner and outer panes have inner surfaces and further including a low emissivity coating on at least one of the respective inner surfaces of the inner and outer panes.

3. The window module of claim 1 in which the first and second torsion means each comprise:
    a plate having first and second ends;
    one of the first and second ends being rigidly clamped onto one of the first and second parallel edges of the glass envelope; and
    the other of the first and second ends being torsionally clamped to one of the first and second posts.

4. The window module of claim 3 in which each of the inner and outer panes have inner surfaces and further including a low emissivity coating on at least one of the respective inner surfaces of the inner and outer panes.

* * * * *